United States Patent
Budde et al.

(10) Patent No.: US 6,233,124 B1
(45) Date of Patent: May 15, 2001

(54) PIEZOELECTRIC MICROACTUATOR SUSPENSION ASSEMBLY WITH IMPROVED STROKE LENGTH

(75) Inventors: Richard August Budde, Plymouth; David Gordon Qualey, Apple Valley; David Allen Sluzewski, Edina, all of MN (US); James Morgan Murphy, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/311,086

(22) Filed: May 13, 1999

Related U.S. Application Data

(60) Provisional application No. 60/109,221, filed on Nov. 18, 1998.

(51) Int. Cl.[7] .............................. G11B 5/56; G11B 21/10
(52) U.S. Cl. ....................................................... 360/294.4
(58) Field of Search .................. 360/294.4, 294.1–294.3, 360/294.6

(56) References Cited

U.S. PATENT DOCUMENTS

| | | | |
|---|---|---|---|
| 3,678,482 | 7/1972 | Billawala | 340/174.1 |
| 3,924,268 | 12/1975 | McIntosh et al. | 360/78 |
| 4,374,402 | 2/1983 | Blessom et al. | 360/104 |
| 4,605,977 | 8/1986 | Matthews | 360/103 |
| 4,620,251 | 10/1986 | Gitzendanner | 360/103 |
| 4,651,242 | 3/1987 | Hirano et al. | 360/103 |
| 4,764,829 | 8/1988 | Makino | 360/106 |

(List continued on next page.)

FOREIGN PATENT DOCUMENTS

| | | |
|---|---|---|
| 0 412 221 B1 | 11/1989 | (EP) . |
| 54-045111 * | 4/1979 | (JP) . |
| 63-122069 | 5/1988 | (JP) . |
| 2-263369 | 4/1989 | (JP) . |
| 2-227886 * | 9/1990 | (JP) . |
| 4-134681 | 5/1992 | (JP) . |
| 4-368676 | 12/1992 | (JP) . |
| 5-094682 | 4/1993 | (JP) . |
| 6-020412 | 1/1994 | (JP) . |
| 7-085621 | 3/1995 | (JP) . |
| 11-242864 * | 9/1999 | (JP) . |
| 98/27547 * | 6/1998 | (WO) . |

OTHER PUBLICATIONS

"Silicon Micromachined Electromagnetic Microactuators for Rigid Disk Drives" by Tang et al, *IEEE Transactions on Magnetics*, vol. 31, No. 6, Nov. 1995.

"Magnetic Recording Head Positioning at Very High Track Densities Using a Microactuator–Based, Two–Stage Servo System" by Fan et al., *IEEE Transactions on Industrial Electronics*, vol. 42, No. 3, Jun. 1995.

"A Flexural Piggyback Milli–Actuator for Over 5 Gbit/in$^2$ Density Magnetic Recording" by Koganezawa et al, *IEEE Transactions on Magnetics*, vol. 32, No. 5, Sep. 1996.

(List continued on next page.)

*Primary Examiner*—William Klimowicz
(74) *Attorney, Agent, or Firm*—Kinney & Lange, P.A.

(57) ABSTRACT

A microactuation system is disclosed for selectively altering a position of a transducing head carried by a slider in a disc drive system with respect to a track of a rotatable disk having a plurality of concentric tracks. The disc drive system includes a load beam having a base for attachment to an actuator arm and a head suspension for supporting the slider over the rotatable disc. A microactuation system includes a piezoelectric element attached between the base and the head suspension of the load beam and beams or hinges connecting the head suspension to the base. The piezoelectric element is deformable in response to a voltage applied thereto. The beams are sufficiently compliant to permit movement of the head suspension with respect to the base upon deformation of the piezoelectric elements.

16 Claims, 5 Drawing Sheets

U.S. PATENT DOCUMENTS

| | | | |
|---|---|---|---|
| 4,853,810 | 8/1989 | Pohl et al. | 360/103 |
| 4,914,725 | 4/1990 | Belser et al. | 318/560 |
| 5,021,906 | 6/1991 | Chang et al. | 360/103 |
| 5,025,346 | 6/1991 | Tang et al. | 361/283 |
| 5,034,828 | 7/1991 | Ananth et al. | 360/75 |
| 5,065,268 | 11/1991 | Hagen | 360/104 |
| 5,079,659 | 1/1992 | Hagen | 360/104 |
| 5,105,408 | 4/1992 | Lee et al. | 369/44.15 |
| 5,177,652 | 1/1993 | Yamaguchi et al. | 360/78.05 |
| 5,189,578 | 2/1993 | Mori et al. | 360/106 |
| 5,255,016 | 10/1993 | Usui et al. | 346/140 |
| 5,276,573 | 1/1994 | Harada et al. | 360/103 |
| 5,303,105 | 4/1994 | Jorgenson | 360/106 |
| 5,364,742 | 11/1994 | Fan et al. | 430/317 |
| 5,461,272 | 10/1995 | Matsumoto | 310/309 |
| 5,521,778 | 5/1996 | Boutaghou | 360/106 |
| 5,539,267 | 7/1996 | Fan et al. | 310/309 |
| 5,552,809 | 9/1996 | Hosono et al. | 347/10 |
| 5,623,461 | 4/1997 | Sohmuta | 369/32 |
| 5,657,188 | 8/1997 | Jurgenson et al. | 360/106 |
| 5,711,063 | 1/1998 | Budde et al. | 29/603.06 |
| 5,745,319 | 4/1998 | Takekado et al. | 360/78.05 |
| 5,764,444 | 6/1998 | Imamura et al. | 360/109 |
| 5,781,381 | 7/1998 | Koganezawa et al. | 360/106 |
| 5,793,571 | 8/1998 | Jurgenson et al. | 360/104 |
| 5,796,558 | 8/1998 | Hanrahan et al. | 360/106 |
| 5,805,375 | 9/1998 | Fan et al. | 360/78.12 |
| 5,805,382 | 9/1998 | Lee et al. | 360/104 |
| 5,828,644 | 10/1998 | Gage et al. | 369/112 |
| 5,856,896 | 1/1999 | Berg et al. | 360/104 |
| 5,862,010 | 1/1999 | Simmons et al. | 360/97.01 |
| 5,862,015 | 1/1999 | Evans et al. | 360/104 |
| 5,867,347 | 2/1999 | Knight et al. | 360/104 |
| 5,896,246 | 4/1999 | Budde et al. | 360/104 |
| 5,898,541 | 4/1999 | Boutaghou et al. | 360/109 |
| 5,898,544 | 4/1999 | Krinke et al. | 360/104 |
| 6,002,549 * | 12/1999 | Berman et al. | 360/104 |
| 6,046,884 * | 4/2000 | Crane | 360/104 |
| 6,069,771 * | 5/2000 | Boutaghou et al. | 360/104 |
| 6,072,665 * | 6/2000 | Ferrari et al. | 360/104 |
| 6,088,194 * | 7/2000 | Imaino et al. | 360/106 |

OTHER PUBLICATIONS

"Transverse Mode Electrostatic Microactuator for MEMS–Based HDD Slider" by Imamura et al, *IEEE* 1996.

"An Experiment for Head Positioning System Using Sub-micron Track–width GMR Head" by Yoshikawa et al., *IEEE Transactions on Magnetics*, vol. 32, No. 5, Sep. 1996.

"Micro Electrostatic Actuators in Dual–Stage Disk Drives with High Track Density" by Tang et al., *IEEE Transactions on Magnetics*, vol. 32, vol. No. 5, Sep. 1996.

"Piezoelectric Microactuator Compensating for Off–Track Errors in Magnetic Disk Drives" by Imamura et al, *Advance Information Storage Systems*, vol. 5, pp 119–125.

"A Dual–Stage Magnetic Disk Drive Actuator Using a Piezoelectric Device for a High Track Density" by Mori et al., *IEEE Transactions on Magnetics*, vol. 27, No. 6, Nov. 1991.

"Dynamic Loading Criteria for 3–½ Inch Inline HDD Using Multilayer Piezoelectric Load/Unload Mechanism" by Kajitani et al., *IEEE Transactions on Magnetics*, vol. 27, No. 6, Nov. 1991.

"Design, Fabrication, and Testing of Silicon Microgimbals for Super–Compact Rigid Disk Drives" by Temesvary et al., *Journal of Microelectromechanical Systems*, Vol. 4, N.

* cited by examiner

PIEZOELECTRIC MICROACTUATOR SUSPENSION ASSEMBLY WITH IMPROVED STROKE LENGTH

CROSS-REFERENCE TO RELATED APPLICATION

This application claims priority from Provisional Application No. 60/109,221, filed Nov. 18, 1998, entitled "Method of Improving the Stroke of a PZT Microactuator Suspension Assembly" by R. Budde, D. Qualey, D. Sluzewski, and J. Murphy.

BACKGROUND OF THE INVENTION

The present invention relates to a suspension-level microactuator having an improved stroke length. More particularly, it relates to a microactuator located between a suspension and an actuator arm in a disc drive system having piezoelectric elements to selectively move a transducing head radially with respect to a rotatable disc.

The density of concentric data tracks on magnetic discs continues to increase (that is, the size of data tracks and radial spacing between data tracks are decreasing), requiring more precise radial positioning of the head. Conventionally, head positioning is accomplished by operating an actuator arm with a large-scale actuation motor, such as a voice coil motor, to radially position a head on a flexure at the end of the actuator arm. The large-scale motor lacks sufficient resolution to effectively accommodate high track-density discs. Thus, a high resolution head positioning mechanism, or microactuator, is necessary to accommodate the more densely spaced tracks.

One promising design for high resolution head positioning involves employing a high resolution microactuator in addition to the conventional low resolution actuator motor, thereby effecting head positioning through dual-stage actuation. Various microactuator designs have been considered to accomplish high resolution head positioning. However, these designs all had shortcomings that limited the effectiveness of the microactuator. Many designs increased the complexity of designing and assembling the existing components of the disc drive, while other designs were unable to achieve the force and bandwidth necessary to accommodate rapid track access. Therefore, the prior designs did not present ideal microactuator solutions. More recent microactuator designs employ piezoelectric elements to effect movement of the suspension with respect to the actuator arm. This technique has proven effective but suffers from a small range of motion.

There is a need in the art for a piezoelectric microactuator design to provide efficient high resolution head positioning in a dual-stage actuation system that allows for a greater range of motion than current designs and that can be implemented by readily available manufacturing processes.

BRIEF SUMMARY OF THE INVENTION

The present invention is a microactuator for selectively altering a position of a transducing head carried by a slider in a disc drive system with respect to a track of a rotatable disc having a plurality of concentric tracks. The disc drive system includes a base for attachment to an actuator arm and a head suspension for supporting the slider over the rotatable disc. The microactuator includes a first electroactive element attached between the base and the head suspension and a first beam attached between the base and the head suspension. The first electroactive element is longitudinally deformable (by lengthening or shortening) in response to a voltage applied thereto. The first beam is flexible to permit movement of the head suspension with respect to the base.

The first electroactive element is disposed substantially perpendicular to a longitudinal centerline of the base. In one embodiment, the first electroactive element has a length exceeding one half the width of the base. This increased length provides an increased electroactive element stroke length which, in turn, allows for a greater range of motion of the transducing head.

In one embodiment, two electroactive elements are attached between the base and the head suspension, and a second beam is attached between the base and the head suspension. The second electroactive element is deformable in a direction complementary to deformation of the first electroactive element in response to a voltage applied thereto. The second beam is flexible to permit movement of the head suspension with respect to the base.

In another embodiment, two electroactive elements disposed substantially parallel to a longitudinal centerline are employed. The two electroactive elements extend into a cutout window portion of the base to allow for an increased length element.

DETAILED DESCRIPTION

Figure 1:
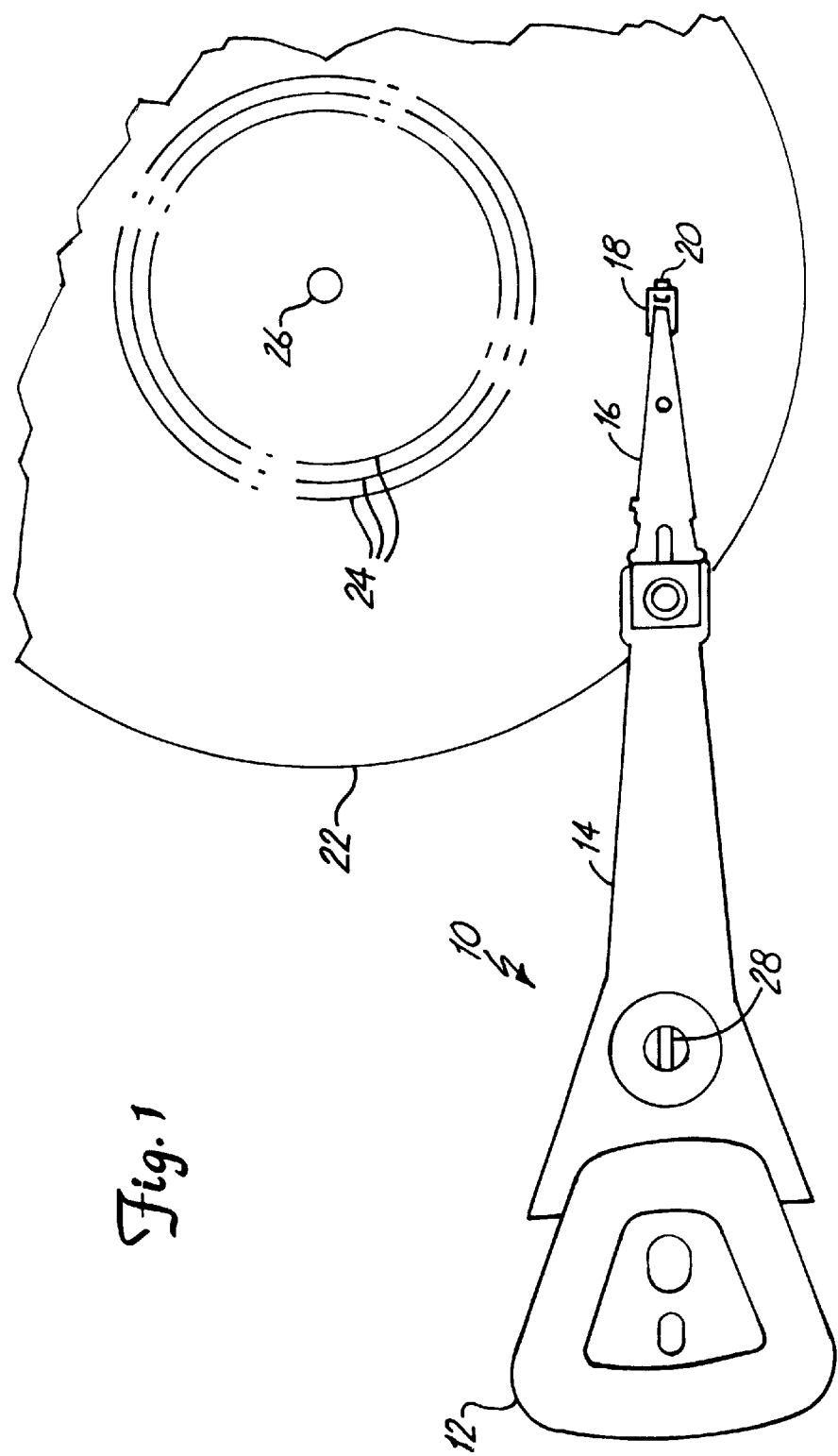
FIG. 1 is a top view of a disc drive actuation system for positioning a slider over tracks of a disc.

FIG. 1 shows a top view of a disc drive actuation system 10 for positioning a transducing head (not shown) over a track of a magnetic disc as known in the prior art. The actuation system 10 includes, as shown from left to right in FIG. 1, a voice coil motor (VCM) 12, an actuator arm 14, a suspension 16, a flexure 18, and a slider 20. The slider 20 is connected to the distal end of the suspension 16 by the flexure 18. The suspension 16 is connected to the actuator arm 14 which is coupled to the VCM 12.

As shown on the right side of FIG. 1, the disc drive assembly includes a disc 22, having a multiplicity of tracks 24, which rotates about an axis 26. During operation of the disc drive assembly, rotation of the disc 22 generates air movement which is encountered by the slider 20. This air movement acts to keep the slider 20 aloft a small distance above a surface of the disc 22 allowing the slider 20 to "fly" above the surface of the disc 22. Any wear associated with physical contact between the slider 20 and the disc 22 is thus eliminated.

The flexure 18 provides a spring connection between the slider 20 and the suspension 16. The flexure 18 is configured such that it allows the slider 20 to move in pitch and roll directions to compensate for fluctuations in the spinning surface of the disc 22. Many different types of flexures 18, also known as gimbals, are known to provide the spring connection allowing for pitch and roll movement of the slider 20 and can be used with the present invention.

The VCM 12 is selectively operated to move the actuator arm 14 around an axis 28 thereby moving the suspension 16 and positioning the transducing head (not shown) carried by the slider 20 between tracks 24 of the disc 22. Proper positioning of the transducing head (not shown) is necessary for reading and writing of data on the concentric tracks 24 of the disc 22. For a disc 22 having a high density, however, the VCM 12 lacks sufficient resolution and frequency response to position the transducing head (not shown) on the slider 20 over a selected track 24 of the disc 22. Therefore, a higher resolution actuation device is used.

Figure 2:
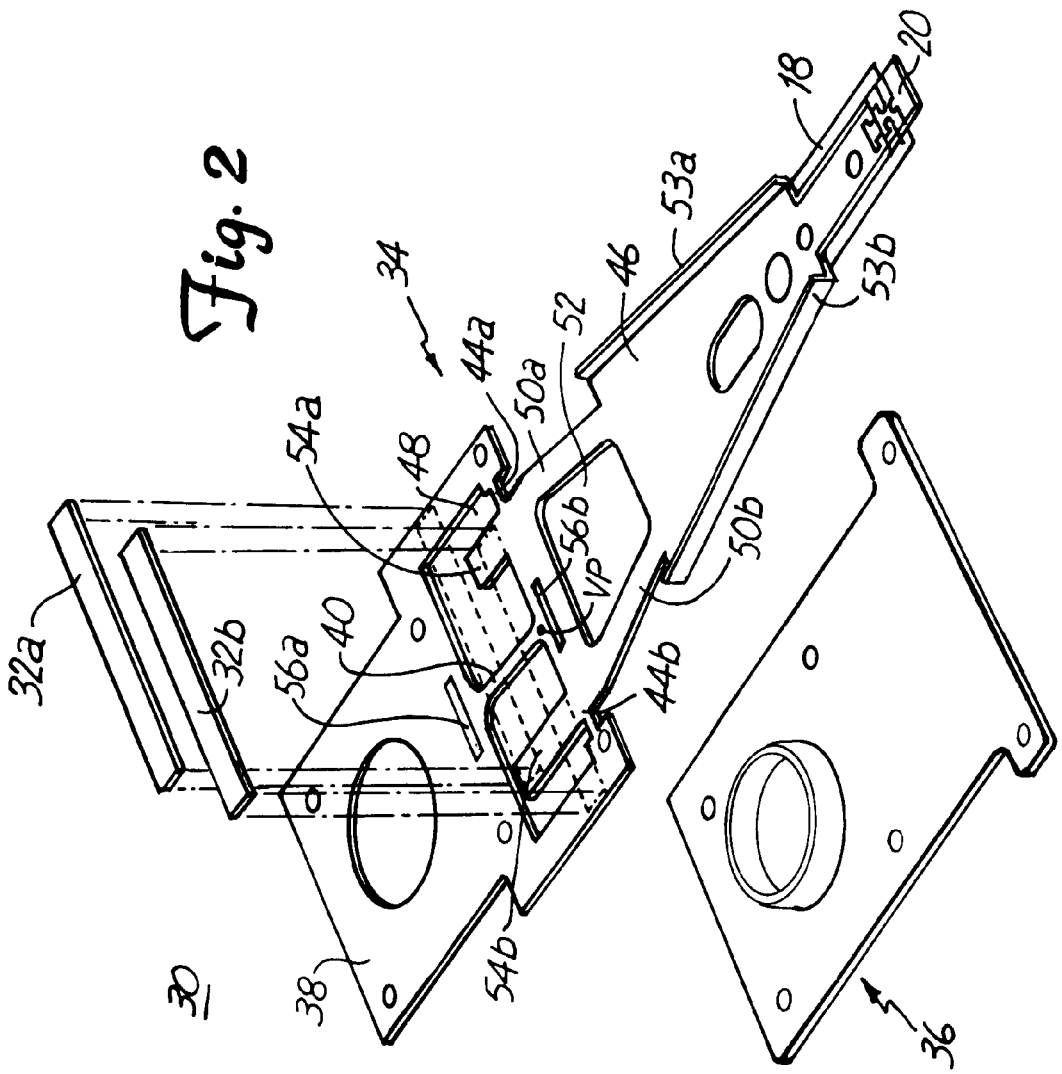
FIG. 2 is an exploded perspective view of a microactuation system for use in a dual-stage disc drive actuation system for high resolution positioning of a slider according to a first embodiment of the present invention.
Figure 3:
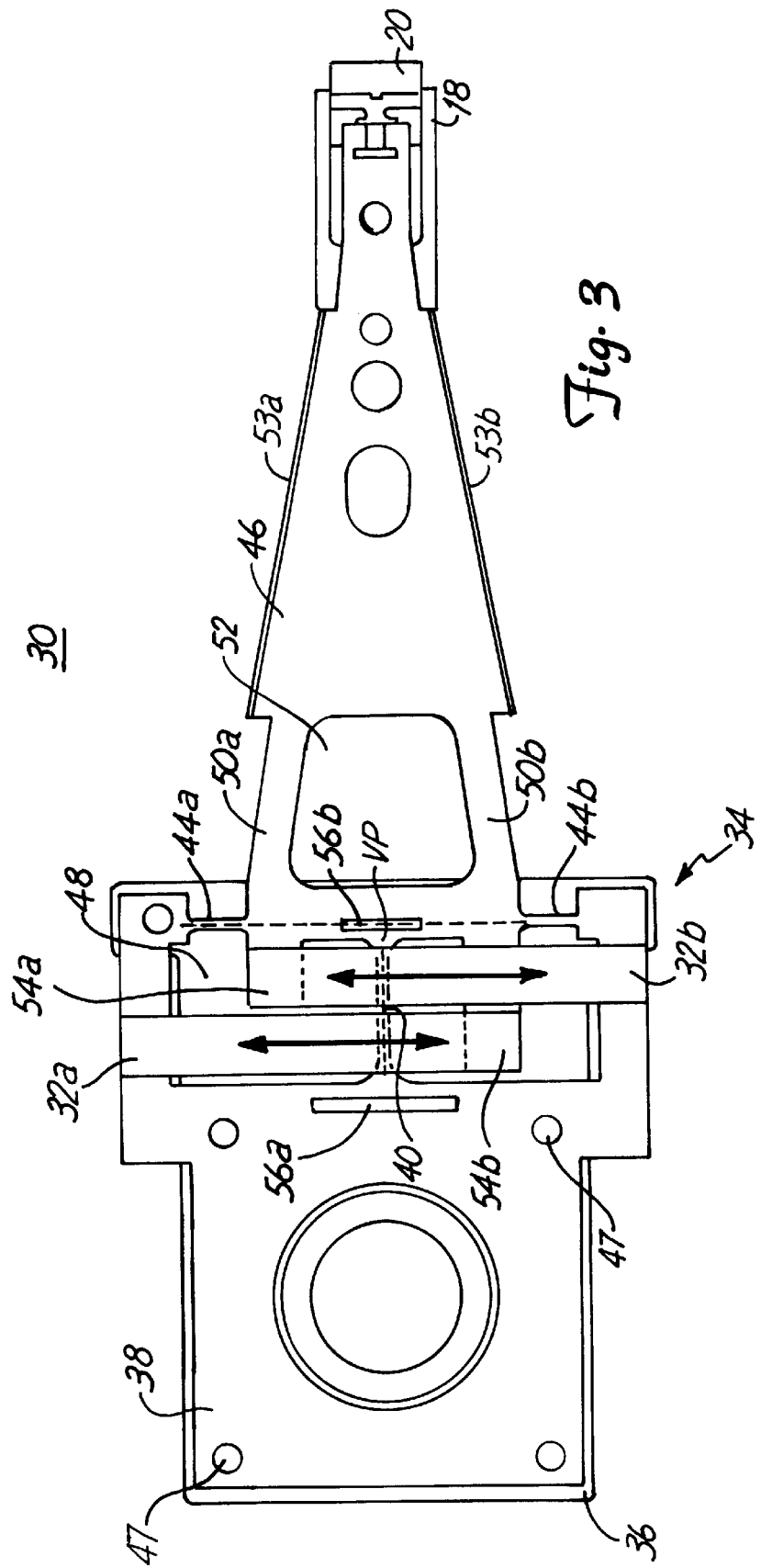
FIG. 3 is a top view of the microactuation system shown in FIG. 2.

FIG. 2 is an exploded perspective view, and FIG. 3 is a top view, of a microactuation system 30 for use in a dual-stage disc drive actuation system for high resolution positioning of a transducing head (not shown) according to a first embodiment of the present invention. As shown from top to bottom in FIG. 2, the microactuation system 30 includes two piezoelectric elements 32a, 32b, a load beam 34, and a base plate 36. The load beam 34 is attached to a top surface of the base plate 36 and the two piezoelectric elements 32a, 32b are attached to a top surface of the load beam 34 as explained in greater detail below. The microactuation system 30 replaces the suspension 16 shown in FIG. 1.

As shown in FIG. 2 and FIG. 3, moving from left to right, or from a proximal end to a distal end, the load beam 34 includes a base 38, a longitudinal microactuation beam 40, two microactuation hinges 44a, 44b, and a head suspension 46. The head suspension 46 is flexibly coupled to the base 38 by the two microactuation hinges 44a, 44b and the longitudinal microactuation beam 40. As best shown in FIG. 3, the two microactuation hinges 44a, 44b are disposed between the base 38 and the head suspension 46 such that they are perpendicular to a centerline of the load beam 34. The longitudinal microactuation beam 40 shares a common centerline with the head suspension 46. It is configured such that it lies below the general plane of the load beam 34 and approximately in the same plane as the base plate 36. The microactuation hinges 44a, 44b and the longitudinal microactuation beam 40 flexibly couple the head suspension 46 to the base 38. These components bias the head suspension 46 to a position in the same plane as and sharing a centerline with the base 38 while allowing movement with respect thereto upon application of a force having an appropriate magnitude and direction.

As shown in FIG. 2, the base 38 of the load beam 34 is mounted to a top surface of the base plate 36 by welds 47 which, in turn, is attached (commonly by a swage technique) to the actuator arm 14 (as shown in FIG. 1). At the right end, as shown in FIG. 3, the base 38 has an aperture 48. The head suspension 46 of the load beam 34 carries the flexure 18 and the slider 20 (as shown in FIG. 3) which in turn carries the transducing head (not shown). At an end opposite from the slider 20, near the center of the load beam 34 as shown in FIG. 3, the head suspension 46 has two pre-load bend legs 50a, 50b disposed at an angle of approximately 30 degrees from a centerline of the head suspension 46 and surrounding a cutout window 52. Located between the pre-load bend legs 50a, 50b, at the proximal end of the head suspension 46, and the slider 20, at the distal end of the head suspension 46, are two edge rails 53a, 53b. The edge rails 53a, 53b are located on transversely opposite sides of the head suspension 46 and provide stiffness to its central region. At a far left end, as best shown in FIG. 2, the head suspension 46 has two mounting arms 54a, 54b extending into the aperture 48 of the base 38.

The piezoelectric elements 32a, 32b are mounted using adhesive to the base 38 at one end and to the mounting arms 54a, 54b, respectively, of the head suspension 46 at the other end. Only a small portion of each end of the piezoelectric elements 32a, 32b is attached to the base 38 and the head suspension 46. The remainder of the lengths of the piezoelectric elements 32a, 32b remains unattached. The piezoelectric elements 32a, 32b are disposed generally parallel to microactuation hinges 44a, 44b across the aperture 48. The piezoelectric elements 32a, 32b are configured such that they extend beyond the centerline of the load beam 34 and extend past each other. This configuration allows substantially longer elements to be used. The piezoelectric elements 32a, 32b are deformable longitudinally (in the direction of the arrows shown in FIG. 3) in response to an applied voltage across the elements. The voltage is applied by methods known to those of the skill in the art such that an electric field generated causing activation of the piezoelectric elements 32a, 32b. The piezoelectric elements 32a, 32b may be poled such that a positive voltage may cause either expansion or contraction.

In this particular embodiment, the piezoelectric elements 32a, 32b are poled oppositely such that application of a positive voltage causes expansion of one element and contraction of the other element. Expansion and contraction of the piezoelectric elements 32a, 32b generates a torque in the head suspension 18 thereby causing deformation of the microactuation hinges 44a, 44b and the longitudinal microactuation beam 40 and causing rotation of the head suspension 46 about a virtual pivot VP. The amount of torque generated in the head suspension is determined by the force applied by the piezoelectric elements 32a, 32b multiplied by the longitudinal distance between the point of application of the force (mounting arms 54a, 54b) and the virtual pivot VP. In the non-symmetrical arrangement shown in FIG. 3, therefore, the piezoelectric element 32a will generate a greater fraction of the total torque than will piezoelectric element 32b because of the greater moment arm. Rotation of the head suspension 46 about the virtual pivot VP causes motion of the slider 20 carrying the transducing head radially with respect to the disc 30. Thus, a controlled voltage applied to piezoelectric elements 32a, 32b maybe utilized to effect high resolution positioning of a transducing head carried by the slider 20 radially with respect to the disc 22. The amount of displacement is directly proportional to the length of the piezoelectric elements 32a, 32b employed.

In the preferred embodiments, the piezoelectric elements 32a, 32b are lead zirconia titanate (PZT) elements. PZT elements are potable piezoelectric elements known in the art. In this first embodiment, the same polarity and magnitude of voltage is applied to each of the piezoelectric elements 32a, 32b. The amount of motion of the transducing head carried by the slider 20 is controlled by the magnitude and polarity of voltage applied to the piezoelectric elements 32a, 32b of a specified length.

Placing the load beam 34 into its operating position raises two challenges. First, when the suspension is placed into its intended operating position, the head suspension 46 of the load beam 34 is rotated upwards with respect to the base 38 about the two microactuation hinges 44a, 44b. This rotation of the head suspension 46 causes the piezoelectric elements 32a, 32b to be displaced towards the base plate 36. To avoid interference of the piezoelectric elements 32a, 32b with the longitudinal microactuation beam 40 caused by this displacement towards the base plate 36, the longitudinal microactuation beam 40 is disposed below the general plane of the base 38 (as best shown in FIG. 2). Two forming relief slots 56a, 56b facilitate the bending of the longitudinal microactuation beam 40 out of the general plane of the load beam 34. In this particular configuration, the longitudinal microactuation beam 40 is disposed about 0.0015 inches below the plane of the base 38.

Second, rotation of the head suspension 46 upward with respect to the base 38 creates a pre-load in the load beam 34 in a downward direction toward the disc 22. This pre-load is transferred from the head suspension 46 to the base 38 (from right to left in FIG. 3) through the pre-load bend legs 50a, 50b, the two microactuation hinges 44a, 44b, the longitudinal microactuation beam 40, and the piezoelectric elements 32a, 32b.

The pre-load applied to the head suspension 46 results in approximately 3 to 4 minutes of a degree of roll static angle in the suspension because of the asymmetric arrangement of the load beam 34. If it is necessary to remove this roll bias from the load beam 34, it may be removed by changing the dimensions of the microactuation hinges 44a, 44b. One of the microactuation hinges 44a, 44b could be made shorter or wider than the other to decrease its compliance and thus the amount of deformation it experiences. Alternatively, one of the two preload bend legs 50a, 50b on the head suspension 46 could be made wider than the other. Either of these methods could be used to add symmetrical stiffness to the load beam 34. Removing any roll bias from the head suspension 46 is important because it maintains the slider 20 in a position parallel to the disc 22.

Figure 4:
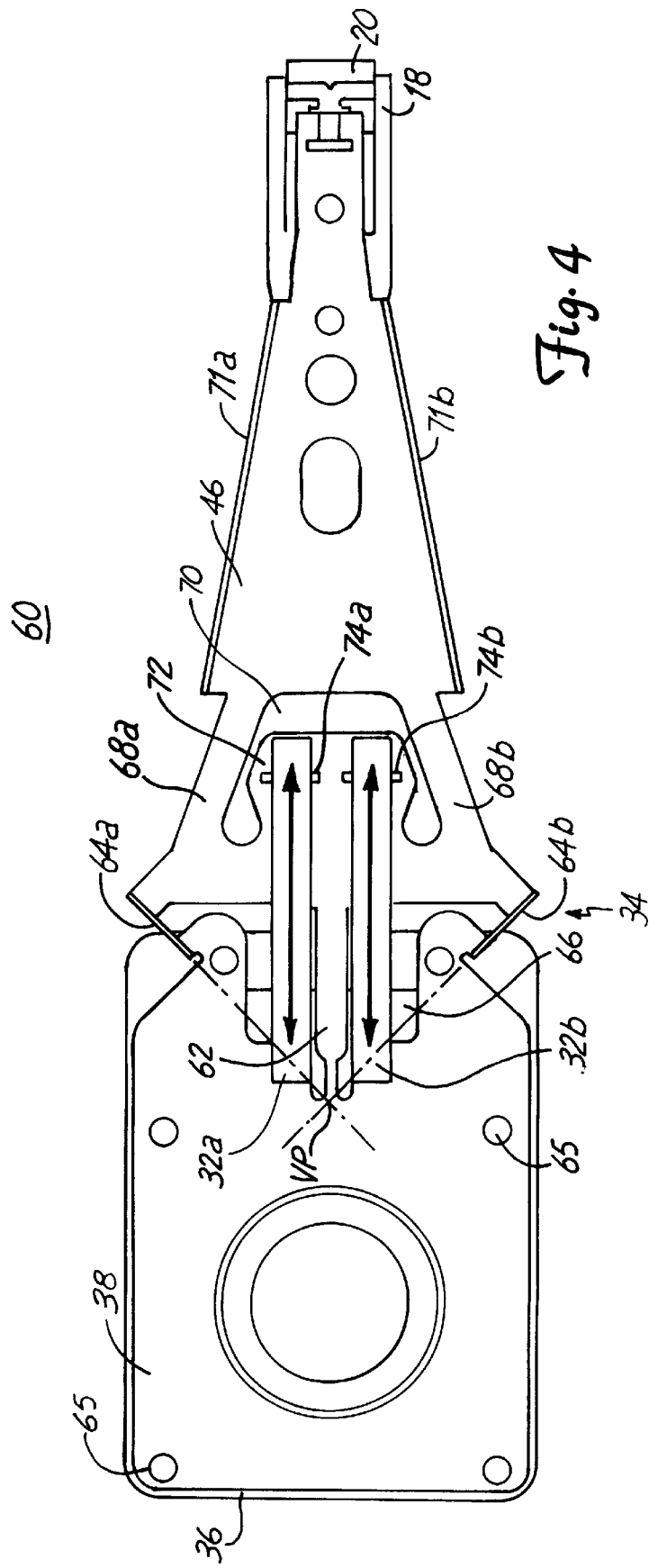
FIG. 4 is a top view of a microactuation system for use in a dual-stage disc drive actuation system for high resolution positioning of a slider according to a second embodiment of the present invention.

FIG. 4 is a top view of the microactuation system 60 used in a dualstage disc drive actuation system for high resolution positioning of a transducing head (not shown) according to a second embodiment of the present invention. In the second embodiment, the microactuation system 60 includes two piezoelectric elements 32a, 32b, a load beam 34, and a base plate 36. The load beam 34 is attached to a top surface of the base plate 36 and the two piezoelectric elements 32a, 32b are attached to a top surface of the load beam 34 as explained in further detail below. The microactuation system 60 replaces the suspension 16 shown in FIG. 1.

As shown in FIG. 4, moving from left to right, or from a proximal end to a distal end, the load beam 34 includes base 38, a longitudinal microactuation beam 62, two microactuation hinges 64a, 64b, and a head suspension 46. The head suspension 46 is flexibly coupled to the base 38 by the two microactuation hinges 64a, 64b and the longitudinal microactuation beam 62. As shown near the middle of FIG. 4, the longitudinal microactuation beam 62, which is disposed in the same general plane as the base 38, shares a common centerline with the head suspension 46 and is connected at one end to the base 38 and at the other end to the head suspension 46. The microactuation hinges 64a, 64b connect the base 38 to the head suspension 46 and are disposed at an angle of approximately 45 degrees from a centerline of the head suspension 46. These three components operate to flexibly couple the head suspension 46 to the base 38. These components bias the head suspension 46 to a position having a common centerline with the base 38 while allowing motion of the head suspension 46 with respect to the base 38 upon application of a force having an appropriate magnitude and direction.

The microactuation hinges 64a, 64b are bent normal to the general plane of the load beam 34. This arrangement provides increased compliance for rotation about a virtual pivot VP to facilitate rotation of the head suspension 46 and movement of the slider 20 across the tracks 24 of the disc 22. At the same time, this configuration provides substantial stiffness in other directions to resist undesired movements and vibrations out of the plane parallel to the disc 22.

As shown in FIG. 4, the base 38 of the load beam 34 is mounted to the base plate 36 by welds 65 which, in turn, is attached (commonly by a swage process) to the actuator arm 14 (as shown in FIG. 1). At one end, the base 38 has an aperture 66. The head suspension 46 of the load beam 34 carries the flexure 18 and the slider 20 which, in turn, carries the transducing head (not shown). At an end opposite the slider 20, near a center of the load beam 34 as shown in FIG. 4, the head suspension 46 has two pre-load bend legs 68a, 68b disposed at an angle of approximately 30 degrees from a centerline of the head suspension 46 and surrounding cutout window 70. Located between the pre-load bend legs 68a, 68b, at the proximal end of the head suspension 46, and the slider 20, at the distal end of the head suspension 46, are two edge rails 71a, 71b. The edge rails 71a, 71b are located on transversely opposite sides of the head suspension 46 and provide stiffness to its central region. Also at the proximal end, the head suspension 46 has a mounting tab 72 protruding into the cutout window 70 between the pre-load bend legs 68a, 68b. The mounting tab 72 has two slots 74a, 74b located laterally from a longitudinal centerline.

As shown in FIG. 4, the piezoelectric elements 32a, 32b are mounted using adhesive on top of the load beam 34 in a parallel fashion at equal distances from its centerline. As shown from left to right in FIG. 4, a first end of the piezoelectric elements 32a, 32b is connected to the base 38 near an edge of the aperture 66 and a second end is connected to the mounting tab 72 located between the pre-load bend legs 68a, 68b of the head suspension 46. The presence of the mounting tab 72 allows the piezoelectric elements 32a, 32b to have a length greater than one half the width of the base 38 by allowing them to extend into the area of the cutout window 70.

To maximize the stroke lengths of the piezoelectric elements 32a, 32b, it is important to maximize their effective lengths. The effective length is the length of the piezoelectric elements 32a, 32b between the adhesive bonding points. Two slots 74a, 74b are cut in the mounting tab 72. The slots 74a, 74b act as stops to prevent adhesive from moving farther down the piezoelectric elements 32a, 32b and thereby maximizes the effect lengths of the elements.

Like the piezoelectric elements 32a, 32b in the first embodiment of the present invention, the piezoelectric elements 32a, 32b in the second embodiment of the present invention are deformable longitudinally in response to an applied voltage (in the direction of the arrows shown in FIG. 4). Also, the piezoelectric elements 32a, 32b are poled oppositely such that application of a positive voltage causes one element to expand and the other element to contract. Expansion and contraction of piezoelectric elements 32a, 32b generates a torque in the head suspension 28 which causes deformation in the microactuation hinges 64a, 64b and the longitudinal microactuation beam 62 and causes rotation of the head suspension 46 about a virtual pivot VP. The amount of torque generated in the head suspension 46 is determined by the amount of force applied by the piezoelectric elements 32a, 32b multiplied by the lateral distance between the point of application of the force and the virtual pivot VP.

Rotation of the head suspension 46 about the virtual pivot VP causes motion of the slider 20 carrying the transducing head radially with respect to the disc 22. Thus, during operation of the microactuation system 60, a controlled voltage is applied to the piezoelectric elements 32a, 32b to effect high resolution positioning of the transducing head with respect to tracks 24 of the disc 22. The amount of displacement is directly proportional to the magnitude of voltage applied and to the length of the piezoelectric elements 32a, 32b employed.

The microactuation system 60, shown in FIG. 4, is similar to the microactuation system 30, shown in FIG. 2 and FIG. 3, except that the microactuation hinges 64a, 64b and the piezoelectric elements 32a, 32b are configured differently. The configuration of microactuation system 60, shown in FIG. 4, is symmetrical and thus eliminates the need for symmetrical stiffening as discussed with respect to the microactuation system 30. Also, the microactuation hinges 64a, 64b are bent normal to the plane of the load beam 46 to maximize vertical stiffness.

Figure 5:
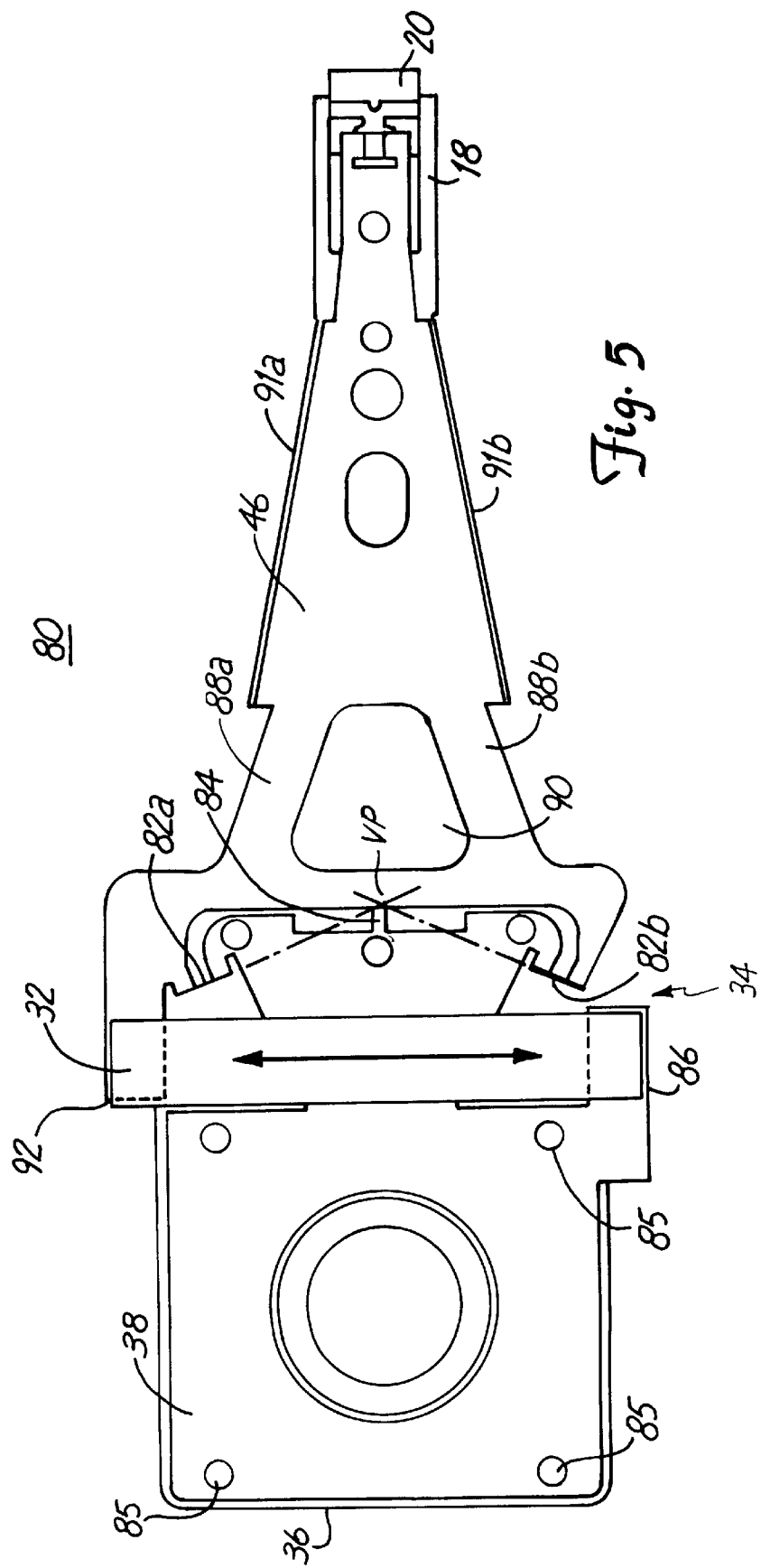
FIG. 5 is a top view of a microactuation system for use in a dual-stage disc drive actuation system for high resolution positioning of a slider according to a third embodiment of the present invention.

FIG. 5 is a top view of a microactuation system 80 for use in a dual-stage disc drive actuation system for high resolution positioning of a transducing head (not shown) according to a third embodiment of the present invention. As shown from top to bottom in FIG. 5, the microactuation system 80 includes a piezoelectric element 32, a load beam 34, and a base plate 36. The load beam 34 is attached to a top surface of the base plate 36 and the piezoelectric element 32 is attached to a top surface of the load beam 34 as explained in greater detail below. The microactuation system 80 replaces the suspension 16 shown in FIG. 1.

As shown from left to right in FIG. 5, the load beam 34 includes a base 38, two microactuation hinges 82a, 82b, a longitudinal microactuation beam 84, and a head suspension 46. The head suspension 46 is flexibly coupled to the base 38 by the two microactuation hinges 82a, 82b and the longitudinal microactuation beam 84. As shown near the middle of FIG. 5, the two microactuation hinges 82a, 82b are symmetrically disposed between the base 38 and the head suspension 46 at an angle of approximately 60 degrees from and lateral to a centerline of the load beam 34. The longitudinal microactuation beam 84 connects the base 38 to the head suspension 46 approximately along the center line of the load beam 34. These components bias the head suspension 46 to a position having a common centerline with the base 38 while allowing motion of the head suspension 46 with respect to the base 38 upon application of a force having an appropriate magnitude and direction.

The load beam 34, including base 38, the head suspension 46, the longitudinal microactuation beam 84, and the microactuation hinges 82a, 82b, are formed from a single sheet of material. The microactuation hinges 82a, 82b are then bent normal to the general plane of the load beam 34 in its non-load condition. This configuration of the microactuation hinges 82a, 82b is intended to maximize the vertical stiffness and minimize the lateral stiffness of the load beam 34. This arrangement provides increased compliance for rotation about a virtual pivot VP to facilitate rotation of the head suspension 46 and movement of the slider 20 across the tracks 24 of the disc 22. At the same time, this configuration provides substantial stiffness in other directions to resist undesired movements and vibrations out of the plane parallel to the disc 22.

As shown in FIG. 5, the base 46 of the load beam 34 is mounted to a top surface of the base plate 38 by welds 85 which, in turn, is attached (commonly be a swage process) to the actuator arm 14 (as shown in FIG. 1). At the right end, as shown in FIG. 5, the base 38 has a mounting arm 86 extending toward the head suspension 46. The head suspension 46 of the load beam 34 carries the flexure 18 and the slider 20 which, in turn, carries the transducing head (not shown). At an end opposite the slider 20, near the center of the load beam 34 as shown in FIG. 5, the head suspension 46 has two pre-load bend legs 88a, 88b disposed at an angle of approximately 30 degrees from a centerline of the head suspension 46 and surrounding a cutout window 90. Located between the pre-load bend legs 88a, 88b, at the proximal end of the head suspension 46, and the slider 20, at the distal end of the head suspension 46, are two edge rails 91a, 91b. The edge rails 91a, 91b are located on transversely opposite sides of the head suspension 46 and provide stiffness to its central region. Also at the proximal end, on one side of the centerline, the head suspension 46 has a mounting arm 92 extending toward the base 38.

The piezoelectric element 32 is mounted to the mounting arm 86 of the base 38 at one end and to the mounting arm 92 of the head suspension 46 at the other end. The piezoelectric element 32 extends across the entire length of the base 38 and is disposed perpendicular to a center line of the load beam 34. The piezoelectric element 32 is not attached to the load beam 34 at any other point.

When the microactuation system 80 is in use, the piezoelectric element 32 may be energized to effect positioning of a transducing head (not shown) on the slider 20 relative to the disc 22. The piezoelectric element 32 is constructed from the same material as that of the previously described embodiments. When a positive voltage is applied to the piezoelectric element 32, it expands (in the direction of the arrow shown in FIG. 5) and imparts a torque on the head suspension 46 causing rotation of the head suspension 46 about a virtual pivot VP. This rotation of the head suspension 46 causes movement of the slider 20 with respect to the disc 22. The amount of torque experienced by the head suspension 46 is determined by the magnitude of the force applied by the piezoelectric element 32 multiplied by the longitudinal distance between the point of attachment on the head suspension 46 (shown as mounting arm 92 in FIG. 5) and the virtual pivot VP. When a negative voltage is applied to the piezoelectric element 32, it contracts causing rotation of the head suspension 46 about the virtual pivot VP in an opposite direction. The polarity and magnitude of voltage applied to the piezoelectric element 32 controls the direction and amount of displacement of the transducing head (not shown) on the slider 20.

When the microactuation system 80 is placed in its intended operating position, a pre-load is applied to the head suspension 46 and is transmitted from the two pre-load bend legs 88a, 88b to the base 38 through the two microactuation hinges 82a, 82b, the longitudinal microactuation beam 84, and the piezoelectric element 32. The asymmetric configuration of the load beam 34 tends to cause three to four minutes of a degree of static roll bias in the head suspension 46. To counter this roll bias, various features of the load beam 34 may be modified to enhance symmetrical stiffness. For example, one of the pre-load bend legs 88a, 88b could be widened to enhance stiffness, or one of the microactuation hinges 82a, 82b could be modified to enhance symmetrical stiffness. Increasing the length of one of the microactuation hinges 82a, 82b will increase its compliance in the general plane of the load beam 34 and decreasing the length will have an opposite effect. Alternatively, increasing the height of one of the microactuation hinges 82a, 82b extending normal to the plane of the base 38 will increase its stiffness to movement in the general plane of the load beam 34 and decreasing the height will have an opposite effect. Also, the placement of the welds 85 bonding the base 38 to the base plate 36 could be altered.

The various configurations of the present invention provide a mechanism for positioning a transducing head (not shown) carried by a slider 20 with a great deal of precision. These configurations also provide an a greater range of motion by using longer piezoelectric elements 32. An element with a greater length experiences greater deformation when subjected to a voltage. The mechanism is compliant in the direction of head movement to allow sufficient movement in response to a force generated by the piezoelectric elements, but is stiff and resistant to undesired forces in other directions. This is achieved by the configuration of beams and hinges connected between the head suspension 46 and the base 38 of the load beam 34. The configuration of beams and hinges also allows for the removal of any roll experienced by the head suspension 46.

The above description of the present invention is focused on a number of preferred embodiments. It should be understood that a number of other configurations may potentially be employed that embody the principles and concept of the present invention, which is to provide a plurality of beams or hinges between a disc drive slider and the block to which it is mounted, the beams being compliant to permit rotation of the slider with respect to the mounting block while resisting movements and vibrations in other directions. The entire assembly is configured to allow maximum length of the piezoelectric elements which, in turn, allows maximum displacement of the slider.

Also, although the present invention is described with reference to piezoelectric elements as the active elements, other similar materials could be used instead. For example, any one of electroactive ceramics, electroactive polymers, and electrostrictive ceramic materials (collectively, electroactive materials or electroactive elements) could be interchanged with piezoelectric elements 32a, 32b (as shown in FIG. 1) of the present invention.

Although the present invention has been described with reference to preferred embodiments, workers skilled in the art will recognize that changes may be made in form and detail without departing from the spirit and scope of the invention.

What is claimed is:

1. A microactuator for selectively altering a position of a transducing head carried by a slider in a disc drive system with respect to a track of a rotatable disc having a plurality of concentric tracks, the disc drive system having a base for attachment to an actuator arm and a head suspension for supporting the slider over the rotatable disc, the microactuator comprising:

a first and a second microactuation hinge attached between the base and the head suspension, the first and the second microactuation hinges being flexible to permit movement of the head suspension with respect to the base about a virtual pivot; and means for selectively altering a position of the slider with respect to the rotatable disc by causing rotation of the head suspension about the virtual pivot, including an electroactive element attached between the base and the head suspension such that a length between attachment points exceeds a length between the virtual pivot and either the first or the second microactuation hinge, the electroactive element being deformable in response to an electrical control signal applied thereto.

2. A microactuator for selectively altering a position of a transducing head carried by a slider in a disc drive system with respect to a track of a rotatable disc having a plurality of concentric tracks, the disc drive system having a base for attachment to an actuator arm and a head suspension for supporting the slider over the rotatable disc, the microactuator comprising:

a first electroactive element attached between the base and the head suspension disposed substantially perpendicular to a longitudinal centerline of the base and extending across the longitudinal center line, the first electroactive element being deformable in response to an electrical control signal applied thereto; and a first beam attached between the base and the bead suspension, the first beam being flexible to permit movement of the head suspension with respect to the base upon deformation of the first electroactive element.

3. The microactuator of claim 2 further comprising a second electroactive element attached between the base and the head suspension and disposed substantially parallel to the first electroactive element and extending across the longitudinal centerline of the base, the second electroactive element being deformable in a direction complementary to deformation of the first electroactive element in response to an electrical control signal applied thereto.

4. The microactuator of claim 3 wherein the electroactive elements are constructed from an electroactive polymeric material.

5. The microactuator of claim 3 wherein the electroactive elements are constructed from a piezoelectric material.

6. The microactuator of claim 3 wherein the electroactive elements are constructed from an electrostrictive ceramic material.

7. The microactuator of claim 2 wherein the first beam extends about 0.0015 inches below the plane of the head suspension.

8. The microactuator of claim 2 wherein the first electroactive element is attached to a near side of the base and a far side of the head suspension such that the electroactive element filly traverses the base in a lateral direction.

9. The microactuator of claim 8 further comprising a first and a second microactuation binge attached between the base and the head suspension, the first and the second microactuation hinges being flexible to permit movement of the head suspension with respect to the base.

10. The microactuator of claim 9 wherein the first and the second microactuation hinges are bent upwards normal to the general plane of the base to increase vertical stiffness and decrease latitudinal stiffness.

11. A microactuator for selectively altering a position of a transducing head carried by a slider in a disc drive system with respect to a track of a rotatable disc having a plurality of concentric tracks, the disc drive system having a base for attachment to an actuator arm and a head suspension for supporting the slider over the rotatable disc, the microactuator comprising:

a first electroactive element, disposed substantially parallel to a longitudinal centerline of the base, attached between the base and the head suspension and extending into a cutout window of the head suspension, the first electroactive element being deformable in response to an electrical control signal applied thereto; and a first beam attached between the base and the head suspension, the first beam being flexible to permit movement of the head suspension with respect to the base.

12. The microactuator of claim 11, further comprising a second electroactive element attached between the base and the head suspension and disposed substantially parallel to the first electroactive element, the second electroactive element being deformable in a direction complementary to deformation of the first electroactive element in response to an electrical control signal applied thereto.

13. The microactuator of claim 11 further comprising a first and a second microactuation hinge disposed lateral to a centerline of the base, attached between the base and the head suspension, the first and the second microactuation hinges being flexible to permit movement of the head suspension with respect to the base.

14. The microactuator of claim 11 wherein the head suspension has a tab extending into the cutout window near a proximal end and further wherein the first electroactive element attaches to the tab.

15. The microactuator of claim 14 wherein the tab on the head suspension has a slot therein to prevent movement of adhesive along the first electroactive element.

16. The microactuator of claim 11 wherein the first electroactive element is disposed parallel to and lateral to a centerline of the base.

* * * * *